United States Patent [19]

Takanashi et al.

[11] Patent Number: 5,488,497
[45] Date of Patent: Jan. 30, 1996

[54] COLOR LIQUID CRYSTAL DEVICE WITH ORGANIC SMOOTHING LAYER OVER ITO SEPARATED BY AN OXIDE LAYER AND A NITRIDE LAYER

[75] Inventors: Hiroshi Takanashi, Soraku; Masami Ogura, Kashihara; Masahiro Tanimoto, Daito, all of Japan

[73] Assignees: Sharp Kabushiki Kaisha; Sanyo Vacuum Industries Co, Ltd., both of Osaka, Japan

[21] Appl. No.: 144,445

[22] Filed: Nov. 2, 1993

[30] Foreign Application Priority Data

Nov. 2, 1992 [JP] Japan ................................. 4-294541

[51] Int. Cl.$^6$ ............................................. G02F 1/13
[52] U.S. Cl. ......................... 359/74; 359/68; 359/79
[58] Field of Search ........................... 354/68, 74, 79, 354/87

[56] References Cited

U.S. PATENT DOCUMENTS 4,929,060  5/1990  Sugimoto et al. .................... 359/68

FOREIGN PATENT DOCUMENTS

| 57-168203 | 10/1982 | Japan . | |
|---|---|---|---|
| 6426821 | 1/1989 | Japan | 359/68 |
| 2282222 | 11/1990 | Japan | 359/68 |
| 2284117 | 11/1990 | Japan | 359/68 |
| 3007911 | 1/1991 | Japan | 359/68 |
| 3220527 | 9/1991 | Japan | 359/68 |
| 4143729 | 5/1992 | Japan | 359/68 |

*Primary Examiner*—William L. Sikes
*Assistant Examiner*—Kenneth Parker
*Attorney, Agent, or Firm*—Birch, Stewart, Kolasch & Birch

[57] ABSTRACT

A color filter is formed on one surface of one of a pair of light-transmitting substrates and an organic overcoat film for smoothing is formed on the color filter. In addition, a metallic or silicon nitride film such as SiNx and a metallic or silicon oxide film such as SiOx are formed thereon in this order before forming the ITC film. The formation of the metallic or silicon nitride film and the metallic or silicon oxide film enhances the adhesion of the ITC film.

6 Claims, 2 Drawing Sheets

COLOR LIQUID CRYSTAL DEVICE WITH ORGANIC SMOOTHING LAYER OVER ITO SEPARATED BY AN OXIDE LAYER AND A NITRIDE LAYER

BACKGROUND OF THE INVENTION

1. Field of the Invention

The present invention relates to a color liquid crystal display device using a color filter for displaying a plurality of colors, and in particular, to a color liquid crystal display device wherein the adhesion of an indium tin oxide (ITO) film formed on an organic overcoat film with which a color filter is coated is enhanced.

2. Description of the Related Art

FIG. 2 is a sectional view of a conventional color liquid crystal display device 63. A plurality of transparent strip electrodes 56a made of ITO are formed in parallel with each other on one surface of a substrate 51a which is one of a pair of light-transmitting substrates 51, 51a displaced in the color liquid crystal display device 63 and an orientation film 57a is formed thereon. A color filter 52 is formed on almost entirety of one surface of the substrate 51 in such a manner that red, green and blue stripe filters are arranged by turns or the three-colors rectangular filters are arranged in a mosaic pattern. Additionally, after an organic overcoat film 53 made of acrylic or polyimide resin is formed on the color filter 52 for smoothing a transparent electrode 56 made of ITO or the like is formed by using a method such as sputtering, and besides, an orientation film 57 is formed thereon.

A liquid crystal material 60 and a plastic spacer 68 are inserted into a portion sandwiched between the above-mentioned light-transmitting substrates 51, 51a and the portion is sealed with a sealing material 59. Polarizing plates 61, 61a are respectively arranged on the other surfaces of the light-transmitting substrates 51, 51a, which are not facing each other. A tape automated bonding (TAB) 62 in which a large scale integrated circuit 64 for driving is mounded is connected to a terminal portion 66b in the color liquid crystal display device 63.

Generally, in the color liquid crystal display device 63 using the color filter 52, it is particularly important to keep the smoothness of the surface of the color filter 52 in view of preventing nonuniformity of color or contrast. Therefore, a transparent electrode is formed by coating the ITO film 56 in a manner such as sputtering method after the surface of the color filter 52 is coated with the organic overcoat film 53 made of acyrlic or polyimide resin for smoothing.

Since the organic overcoated film 53 exists between the color film 52 and the ITO film 56 of the liquid crystal display device 63 produced in such a manner, formation of the ITO film 56 on the surface of the organic overcoat film is conducted at a temperature of about 250° C. or below in an amibience of a mixture of argon and oxygen by using a manner such as sputtering. However, adhesion between the organic overcoat film 53 and the ITO film 56 significantly decreases, which is apt to cause a crack or peeling. This is because, for example, the surface of the organic overcoat film 53 deteriorates due to oxidation. Thus, there is a problem that the connection between the terminal portion 66b of the ITO film 56 and the TAB 62 mounting the LSI 64 for driving can not be secured.

It is an object of the invention to provide a color liquid crystal display device in which adhesion between an ITO film and an organic overcoat film can be improved.

SUMMARY OF THE INVENTION

The invention presents a color liquid crystal display device in which a liquid crystal layer is interposed between a pair of light-transmitting substrates, a color filter is formed on one of the pair of substrates, and an organic protection film and an ITO film are formed on the color filter, characterized in that a metallic nitride or silicon film is interposed between the organic protection film and the ITO film.

Furthermore, the invention is characterized in that a metallic or silicon oxide film is interposed between the metallic or silicon nitride film and the ITO film.

According to the invention, a liquid crystal layer is interposed between a pair of light-transmitting substrates, a color filter is formed on one entire surface of one of the pair of light-transmitting substrates and an organic protection film is formed for smoothing the surface of the color filter. Furthermore, after forming a metallic or silicon nitride film on the entire surface thereof, an ITO film is formed thereon to make a color liquid crystal display device.

Adhesion is enhanced due to interposing a metallic nitride film between the organic protection film and the ITO film and which enables to prevent the ITO film from cracking or peeling.

Additionally, according to the invention, a metallic or silicon oxide film is interposed between the metallic or silicon nitride film and the ITO film of the color liquid crystal display device. Consequently, two layers, namely a metallic or silicon nitride film and a metallic or silicon oxide film are found exist between the organic protection film and the ITO film, which contributes enhancement of the adhesion of the ITO film and enables to securely prevent the ITO film from cracking or peeling.

As aforementioned, according to the invention, interposing a metallic or silicon nitride film between an organic protection film formed on a light transmitting substrate and an ITO film of a color liquid crystal display device prevents the ITO film from cracking or peeling due to, for example, oxidation of the organic protection film.

Furthermore, according to the invention, interposing a metallic or silicon oxide film between the metallic or silicon nitride and the ITO film enhances the adhesion of the ITO film.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENT

Figure 1:
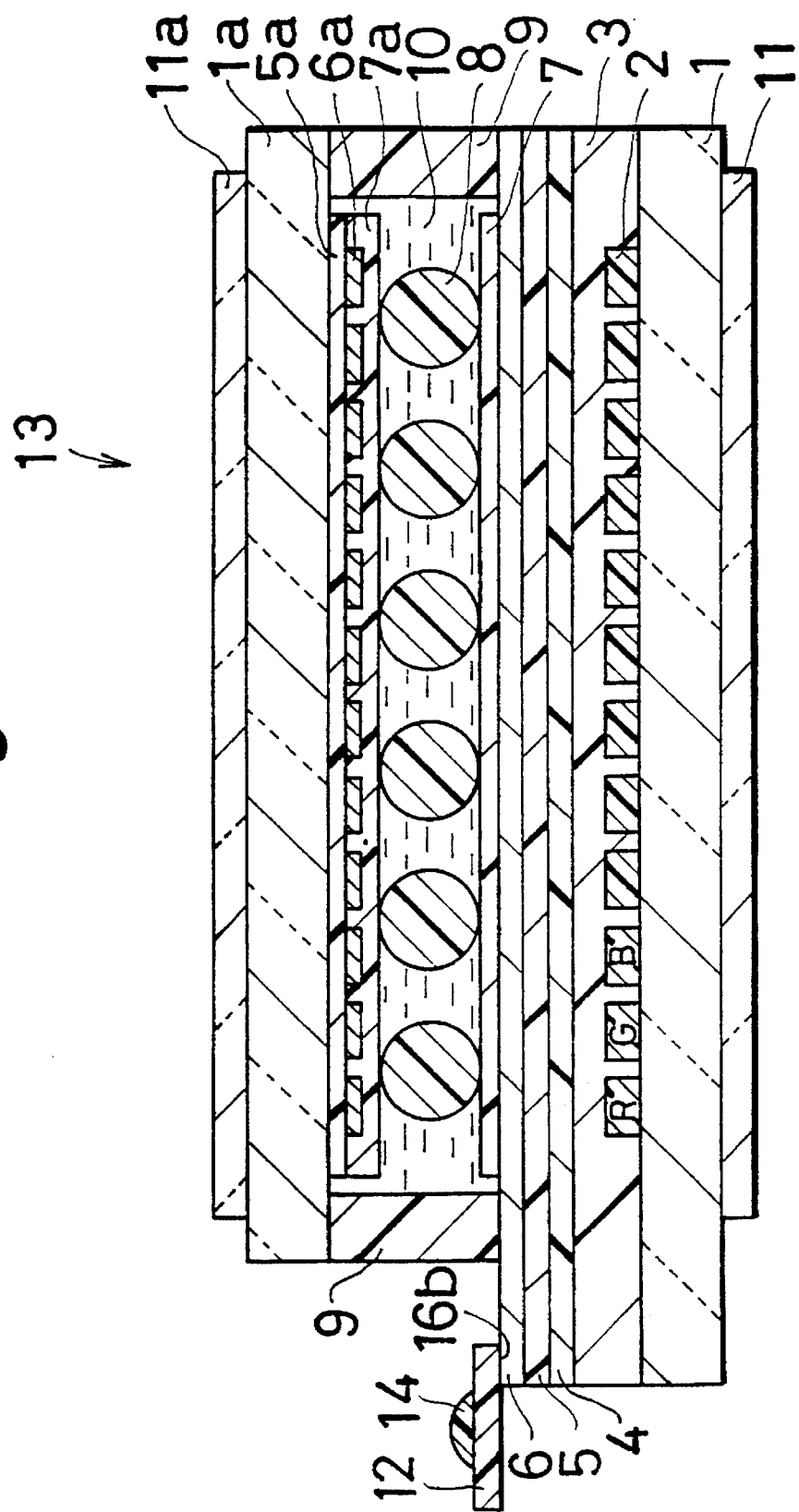
FIG. 1 is a sectional view of a color liquid crystal display device 13, which is an embodiment of the invention.
Figure 2:
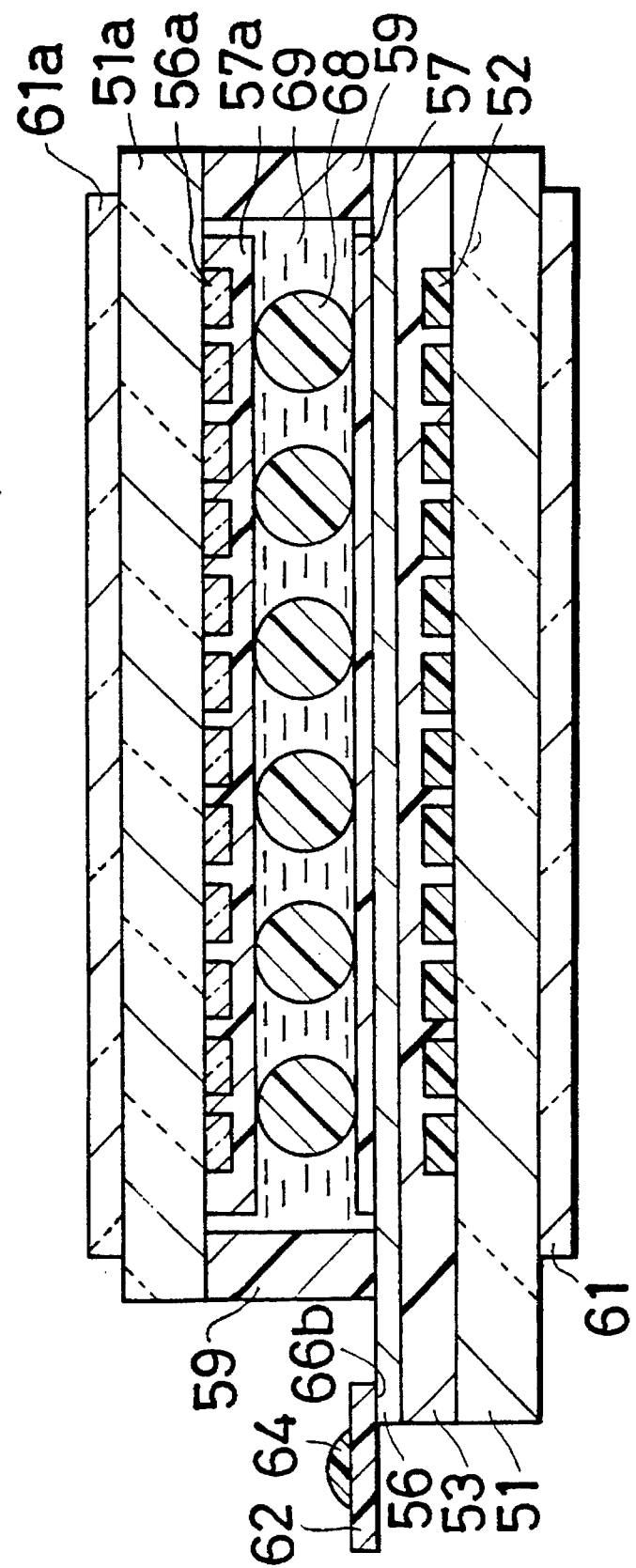
FIG. 2 is a sectional view of a conventional color liquid crystal display device 63.

Now referring to the drawing, preferred embodiments of the invention are described below.

FIG. 1 is a sectional view of a color liquid crystal display device 13 which is an embodiment of the invention. A metallic oxide film 5a such as a LiOx film is formed on one substrate 1a of a pair of light-transmitting substrates 1, 1a and then formation of an ITO film 6a theron and patterning are conducted by etching or the like, whereby a plurality of strip-shaped transparent electrodes are formed thereon. An orientation film 7a is additionally formed thereon.

Besides, a color filter 2 is displaced on an almost entire surface of the substrate 1. The color filter is formed in such a manner that red, green and blue strip filters are disposed by turns or the three-colors rectangular filters are arranged in a mosaic pattern. Additionally, after an organic overcoat film 3 made of acrylic or polyimide resin is formed on the color filter 2 for smoothing, a metallic or silicon nitride film 4 such as a SiNx film with a thickness of 10 to 1000 Å is formed on the entire surface thereof and a metallic or silicon oxide film 5 such as SiOx, AlOx and TiOx with a thickness of 10 to 1000 Å is additionally formed on the entire surface. Furthermore, an ITO film 6 is formed thereon, whereby a transparent electrode is formed. Still further, an orientation film 7 is formed thereon.

A liquid crystal material 10 and a plastic spacer 8 are inserted into a space between the above-mentioned transparent substrates 1, 1a and then the space is sealed with a seal member 9. Polarizing plates 11, 11a are respectively arranged on the other surfaces of the light-transmitting substrates 1, 1a which are not facing each other. A TAB 12 mounting a LSI 14 for driving is connected to a terminal portion 16b of the color liquid crystal display device.

Examples of conditions for forming metallic or silicon oxide films 5, 5a and a metallic or silicon nitride film 4, which are formed before formation of ITO films 6, 6a, will be described.

The metallic or silicon oxide films 5, 5a are formed to be, for instance, 200 Å thick by sputtering deposition on conditions that Si is used as a target material; a mixture of Ar and $O_2$ is used as an introduction gas; and the temperature of the substrates is 220° C. at a sputtering vacuum degree of $1.0 \times 10^{-3}$ torr. On the other hand, the metallic or silicon nitride film 4 is formed to be, for instance, 150 Å thick by sputtering deposition on conditions that Si is used as a target material; $N_2$ is used as an introduction gas; and the temperature of the substrates is 220° C. at a sputtering vacuum degree of $9.0 \times 10^{-4}$ torr.

Further, when the metallic or silicon oxide film 4 is formed before forming the ITO film 6, both the formations are conducted in the same chamber by applying a continuous sputtering process.

The color liquid crystal display device 13 of the embodiment and the conventional color liquid crystal display device 63 are compared in Tables 1 and 2. First, the comparison is conducted in view of reliability of connection between a terminal portion and a TAB, namely, between the terminal portion 16b of the ITO film 6 and the TAB 12 and between the terminal 66b of the ITO film 56 and the TAB 62, and the adhesion of surface between the ITO film and an organic overcoat film, namely, between the ITO film 6 and the organic film 3 and between the ITO film 56 and the organic film 53 in course of time on conditions of an ambient temperature of 60° C. and 95% relative humidity. The results are shown in Table 1.

TABLE 1

| Time | 240 hrs. | 500 hrs. | 750 hrs. | 1000 hrs. |
|---|---|---|---|---|
| SiNx + SiOx + ITO (Embodiment) | 10/10 units No anomaly | 10/10 units No anomaly | 10/10 units No anomaly | 10/10 units No anomaly |
| ITO (Conventional) | 10/10 units No anomaly | 3/10 units Wire breaking, Peeling | 6/10 units Wire breaking, Peeling | 10/10 units Anomalies |

As shown in Table 1, anomalies such as wire breaking and peeling occurred in the conventional device already in a relatively early time in a hot and humid condition. On the other hand, no anomaly occurred in the embodiment of the invention, even when 1000 hours had passed. Therefore, between the ITO film 6 and organic overcoat film 3, and the reliability of connection between the terminal portion 16b of the ITO film 6 and the TAB 12, are remarkably enhanced.

Secondly, the comparison is conducted in view of deterioration of the ITO films 6, 56 due to the passage of time the conventional color liquid crystal display 63 and the color liquid crystal display 13 embodying the invention were soaked in a 3 wt % NaOH solution at 40° C. to be obserbed. The results are shown in Table 2.

TABLE 2

| Time | 1 min. | 3 mins. | 6 mins. |
|---|---|---|---|
| SiNx + SiOx + ITO (Embodiment) | 10/10 units No anomaly | 10/10 units No anomaly | 10/10 units No anomaly |
| ITO (Conventional) | 10/10 films No anomaly | 10/10 films Peeling occurred | 10/10 films Peeling occurred |

As shown in Table 2, the adhesion between the organic overcoat film 53 and the ITO film 56 of the conventional device remarkably decreased, which caused peeling of the ITO film 56, since the surface of the organic overcoat film was deteriorated due to oxidation caused by NaOH. On the other hand, it is clear that the metallic or silicon nitride film 4 and the metallic or silicon oxide film 5 contribute the remarkable enhancement of adhesion, because no peeling was found in any films of the embodiment.

In the case of the embodiment, both the metallic or silicon nitride film 4 and the metallic or silicon oxide film 5 are formed before forming the ITO film 6 on the side of the color filter 2. It is also possible to form only the metallic or silicon nitride film 4 before forming the ITO film 6.

The number of X of SiNx which is described in the above embodiment is approximately 1 to 4/3 and it is $Si_3N_4$ that is stably formed during formation of the film. The number of X of SiNx which is also described in the above embodiment is 1 to 2.

The combination of $Si_3N_4$ and $TiO_2$, $Si_3N_4$ and $Al_2O_3$, or $Si_3N_4$ and $Ta_2O_5$ may be applied as that of a metallic or silicon nitride and a metallic or silicon oxide.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A color liquid crystal display device comprising:

a pair of light-transmitting substrates;

a liquid crystal layer interposed between said pair of light-transmitting substrates;

a color filter formed on one of said pair of light-transmitting substrates;

an organic protection film and an electrode film formed on said color filter;

a metallic or silicon nitride film interposed between said organic protection film and said electrode film; and a metallic or silicon oxide film interposed between said metallic or silicon nitride film and said electrode film.

2. A color liquid crystal display device as claimed in claim 1, wherein said electrode film is an ITO film.

3. A color liquid crystal display device as claimed in claim 1, wherein said metallic or silicon oxide film has a thickness between 10 and 1000 Å.

4. A color liquid crystal display device as claimed in claim 1, wherein said metallic or silicon nitride film has a thickness between 10 and 1000 Å.

5. A color liquid crystal display device as claimed in claim 1, wherein said metallic or silicon nitride film comprises a film of $Si_3N_4$.

6. A color liquid crystal display device as claimed in claim 1, wherein said metallic or silicon oxide film comprises a film selected from the group consisting of $SiO$, $SiO_2$, $TiO_2$, $Al_2O_3$ and $Ta_2O_5$.

* * * * *